(12) United States Patent
Gericke

(10) Patent No.: US 8,528,342 B2
(45) Date of Patent: Sep. 10, 2013

(54) POWER PLANT FOR IGSC-PROCESS

(75) Inventor: Bernd Gericke, Cologne (DE)

(73) Assignee: MAN Diesel & Turbo SE, Augsburg (DE)

( * ) Notice: Subject to any disclaimer, the term of this patent is extended or adjusted under 35 U.S.C. 154(b) by 777 days.

(21) Appl. No.: 12/728,416

(22) Filed: Mar. 22, 2010

(65) Prior Publication Data

US 2010/0236254 A1  Sep. 23, 2010

(30) Foreign Application Priority Data

Mar. 23, 2009 (DE) .................. 10 2009 014 447

(51) Int. Cl.
*F02C 1/00* (2006.01)

(52) U.S. Cl.
USPC ............................. 60/772; 60/780

(58) Field of Classification Search
USPC .................. 60/772, 780, 781, 39.182
See application file for complete search history.

(56) References Cited

U.S. PATENT DOCUMENTS

| | | | | |
|---|---|---|---|---|
| 4,058,974 A | * | 11/1977 | Pfenninger | 60/39.12 |
| 4,261,167 A | * | 4/1981 | Paull et al. | 60/781 |
| 4,667,467 A | * | 5/1987 | Archer et al. | 60/781 |
| 4,729,217 A | * | 3/1988 | Kehlhofer | 60/781 |
| 6,256,978 B1 | | 7/2001 | Gericke | |
| 2007/0256422 A1 | * | 11/2007 | Wakefield et al. | 60/772 |
| 2010/0077766 A1 | * | 4/2010 | Panuccio et al. | 60/780 |

FOREIGN PATENT DOCUMENTS

| | | |
|---|---|---|
| DE | 101 55 508 | 10/2008 |
| WO | WO2006131283 | 12/2006 |

* cited by examiner

*Primary Examiner* — Phutthiwat Wongwian
(74) *Attorney, Agent, or Firm* — Cozen O'Connor

(57) ABSTRACT

A power plant has a coal gasification device for gasifying coal, particularly with water injection, a gas combustion device, particularly a CES burner, for combusting synthesis gas, particularly purified synthesis gas, from the coal gasification device, a hot gas expander for generating usable output power by expansion of flue gas from the gas combustion device, a steam generator, particularly a waste heat steam generator, for heating, particularly for evaporating and/or superheating, feedwater through exhaust heat of the expanded flue gas, a steam turbine set with at least a first stage for expanding steam, particularly high-pressure steam, from the steam generator, and a reheater which is arranged after the first stage of the steam turbine set and through which expanded flue gas flows. In this power plant, the cold rail of the reheater is throttled by a throttle device for constant pressure operation on the high-pressure side, and the steam parameters for the cold reheater rail are achieved by a conditioning valve for sliding pressure operation on the high-pressure side.

18 Claims, 2 Drawing Sheets

US 8,528,342 B2

POWER PLANT FOR IGSC-PROCESS

BACKGROUND OF THE INVENTION

1. Field of the Invention

The present invention is directed to a power plant with a coal gasification device, a gas generator and a reheater. A process for operating the power plant of the invention, and the use of individual components thereof is also disclosed.

2. Description of the Related Art

The environmental and economic requirements on power plants such as are described, for example, in DE 101 55 508 C5 and DE 198 29 088 C2 (U.S. Pat. No. 6,256,978), increase continually. Particularly for the reduction of carbon dioxide, there are two theoretical concepts: one is to increase cycle efficiency, and the other is to capture carbon dioxide ($CO_2$) from the power plant process and reuse it.

With the tested and affordable elements at hand, only $CO_2$ capture is currently feasible. The IGCC process, on the one hand, is known for this purpose, wherein the pollutants specific to carbon that are contained in the raw gas such as $H_2S$, COS, $NH_3$, HCN and the like are already removed before it is combusted in a gas turbine in a special purification process. Carbon monoxide contained in the raw gas is converted to hydrogen and $CO_2$ by another process step, the CO shift, and is separated out prior to combustion. These separating processes require a high expenditure on apparatus.

In addition to the IGCC process, the oxy-fuel process is also known, for example, from DE 10 2005 026 534 A1 (WO2006/131283), in which the combustion is carried out with pure oxygen and the $CO_2$ is separated in a flue gas condenser.

The integrated gasification simple cycle (IGSC) process known, for example, from the articles "Lose the carbon, not your capacity", tce today, December 2008/January 2009, pages 43-44, and "Competition hots up in the UK . . . ", Modern Power Systems, May 2008, page 30, combines the advantages of the IGCC and oxy-fuel processes.

However, because it causes an increase in the acid dew point, the high partial pressure of $SO_2$ and water vapor at high gas pressure requires a constant feedwater temperature at the entrance into the boiler independent from load. This substantially limits flexibility in the operation of the power plant. Since the feedwater temperature drops below the acid dew point as the load decreases, the power plant must still be operated constantly at the full load point.

Therefore, it is an object of the present invention to improve the known power plant process.

SUMMARY OF THE INVENTION

According to the present invention, it is proposed for plants which are operated at constant pressure on the high-pressure (HP) side to keep the cold rail of a reheater at substantially constant pressure by throttling. In this way, the feedwater temperature can be kept above the sulfuric acid dew point by a feedwater/steam heat exchanger which is fed by the cold reheater rail "h". The invention is preferably utilized in plants which are operated at constant pressure on the high-pressure (HP) side.

By throttling on the hot rail of the reheater, the electrical efficiency can decrease as the load decreases because the expansion curve on the high-pressure side is artificially reduced. The temperature of the cold rail of the reheater can also increase as the load decreases. This causes altered heat transfer conditions for the reheater in the boiler.

In sliding pressure installations, a partial flow is removed at "e" before the high-pressure (HP) part of the steam turbine such that the conditions for the removal point "h" are ensured by a conditioning valve.

A power plant according to the present invention comprises a coal gasification device for gasifying coal, particularly by means of oxygen, for example, by General Electric entrained flow gasification (formerly Texaco), Shell entrained flow gasification, or the former GSP method. Quenching is preferably carried out by water injection, wherein the exhaust heat can be used at least partially in a preferred construction.

The exhaust heat recovered from the coal gasification device generates steam which is fed to the waste heat boiler through the cold rail "f" via a connecting line in order to be heated to the required temperature in the reheater ZÜ.

A partial flow of the total reheater steam is fed toward a suitable turbine which drives the air compressor. The compressed air is fed toward the air separation unit which separates the air into oxygen and nitrogen.

In principle, the exhaust gas potential recovered from the coal gasification can be used to generate high pressure and/or medium pressure steam.

The preferably purified synthesis gas from the coal gasification device is burned in a gas combustion device, particularly a CES burner, with oxygen.

The generated flue gas is expanded in a hot gas expander whose output power can be converted into electrical energy particularly by a generator. The inlet temperature can advantageously be controlled or regulated by injecting water into the gas combustion device.

The exhaust heat potential of the expanded flue gas is used in a steam generator to heat, particularly to evaporate and/or superheat, feedwater for a steam turbine.

Following a reheater which is arranged after a first stage of the steam turbine and through which expanded flue gas flows and which can be integrated with the steam generator in a waste heat boiler, a throttle device is provided, according to the present invention, for throttling the cold, output rail of the reheater. The feedwater temperature can be kept above the sulfuric acid dew point in this way. Alternatively, a steam takeoff can be provided in front of the high-pressure (HP) part by a conditioning valve.

The steam turbine preferably has at least one second stage for further expansion of steam from the preceding stage. The reheater and/or throttle device can then be arranged between the first stage and second stage of this steam turbine set.

The flue gas can then be condensed in a flue gas condenser, for example, in an ORC circuit.

A cooling compressor for compressing a partial quantity of the carbon dioxide gas from the flue gas condenser is provided and is connected to the hot gas expander to cool its blading. The remainder of the $CO_2$ gas is compressed in an additional compressor and, for example, is sent to oil fields for increasing oil production (EOR—Enhanced Oil Recovery).

The output power of a refrigerant expander (e.g., $NH_3$ as refrigerant) charged by the flue gas condenser can be used, for example, by a generator and/or for driving the above-mentioned $CO_2$ compressors.

One or more compressors can be provided in an oxygen feed for the coal gasification device and/or the gas combustion device for air decomposition and oxygen recovery.

The waste heat boiler is shown as forced throughput boiler, but generally, if the steam parameters are non-critical, drum boilers can also be used. Depending on the selected mode of operation of the hot gas expander an evaporator (not shown)

can be placed on the flue gas side of the waste heat boiler to protect the heating surfaces of the reheater.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

Other advantages, features and preferred embodiments are described below in connection with the drawings in which.

DETAILED DESCRIPTION OF THE PRESENTLY PREFERRED EMBODIMENTS

Figure 1:
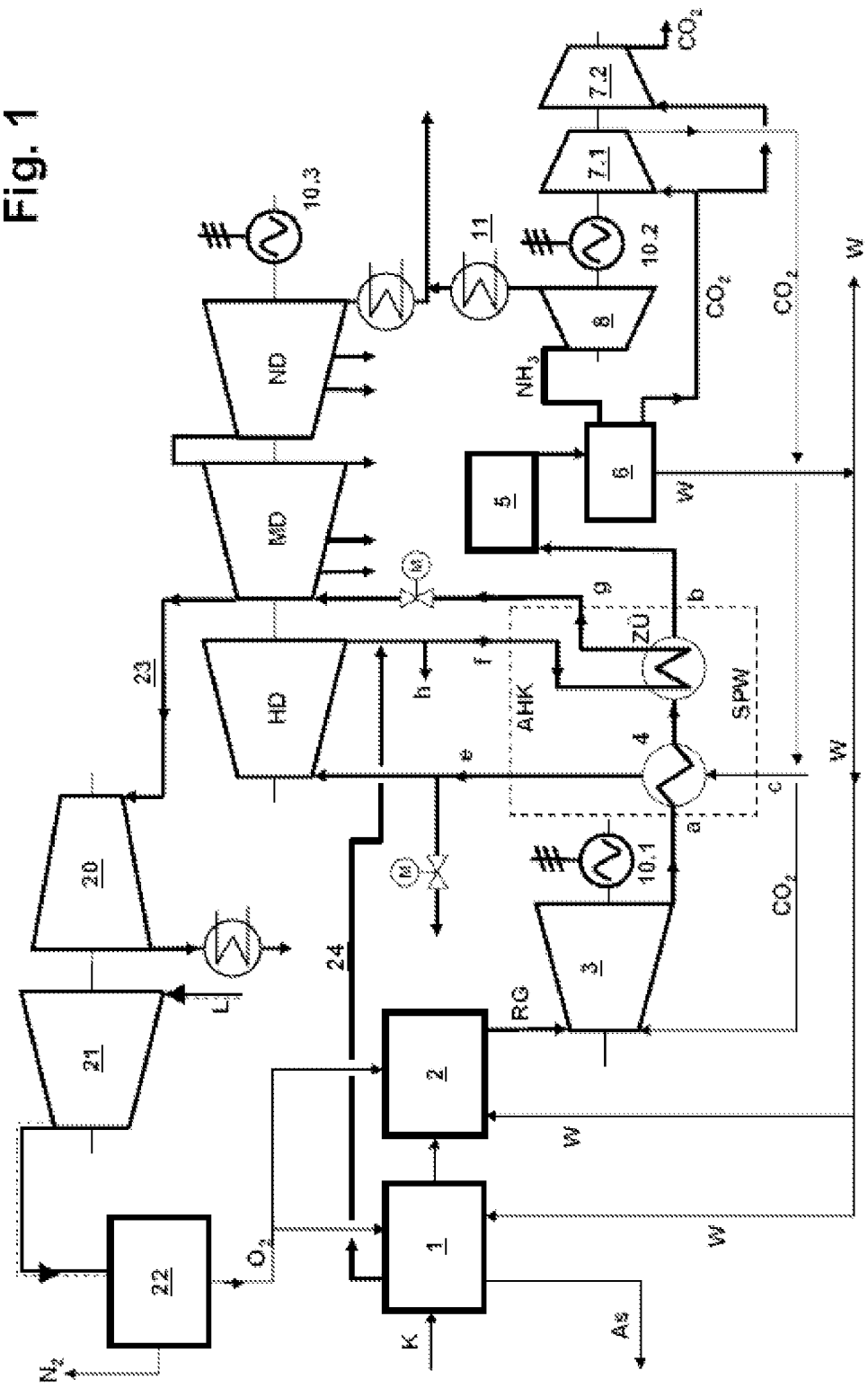
FIG. 1 shows a power plant constructed according to the present invention.

FIG. 1 shows a power plant according to the present invention and the process carried out therein.

Coal K is gasified in a coal gasification device 1 by injecting steam and supplying oxygen $O_2$, the generated liquid ash particles are quenched by injecting water W, and the crystalline ash As formed in this way is removed.

The purified synthesis gas is fed to a CES burner 2 and burned by supplying oxygen $O_2$ and injecting water W.

Flue gas RG which is formed in this way and which contains, among others, water vapor $H_2O$, carbon dioxide $CO_2$, and sulfur oxides $SO_2$ and $SO_3$ is expanded in a hot gas expander 3 whose output power is converted into electrical energy in a generator 10.1.

Figure 2:
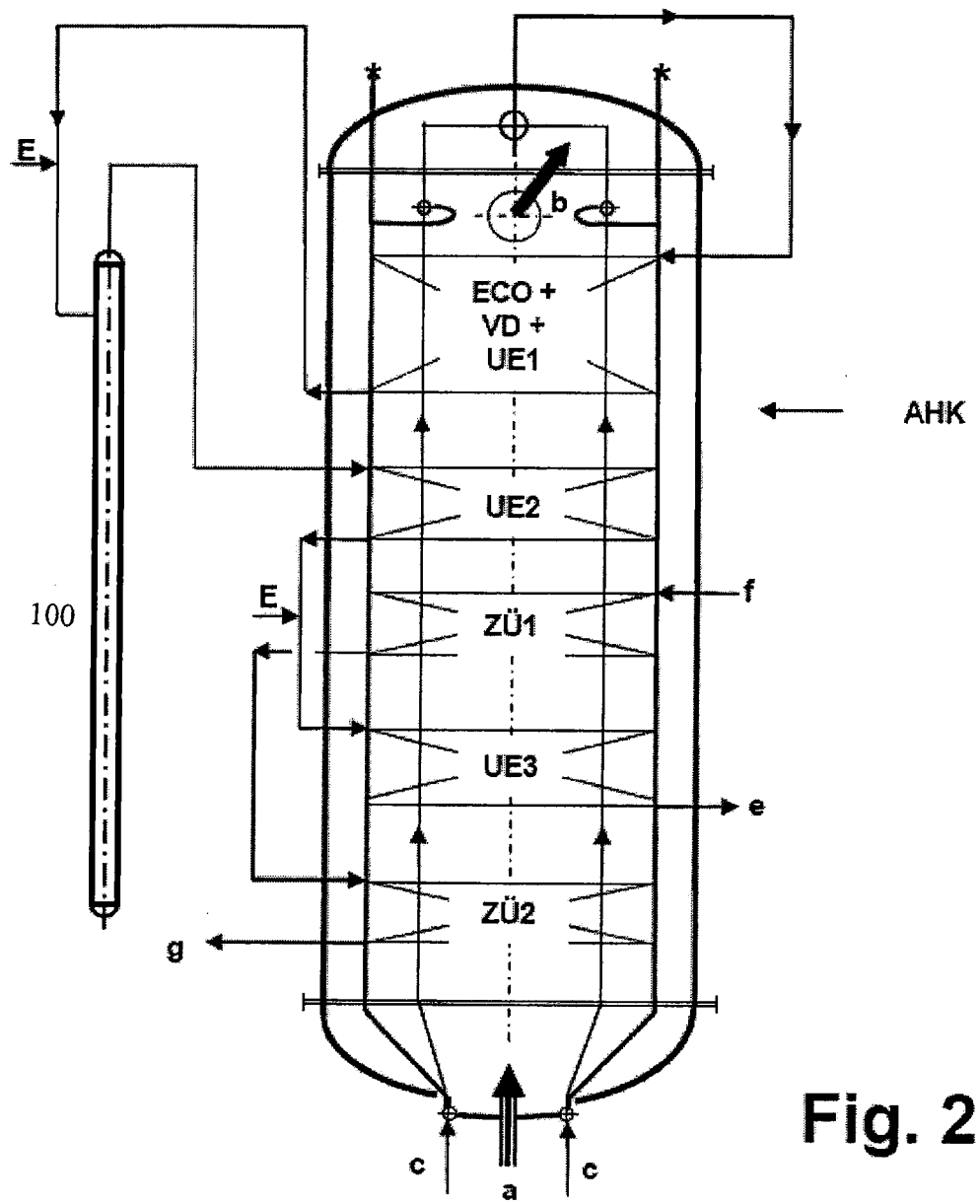
FIG. 2 shows the waste heat boiler from FIG. 1.

At "a", the expanded flue gas RG enters a waste heat boiler AHK which is shown in simplified form in FIG. 2. This waste heat boiler AHK comprises a steam generator, designated by 4 in FIG. 1, for evaporating and superheating feedwater W through exhaust heat of the expanded flue gas and a reheater which is designated by ZÜ in FIG. 1.

As is shown in FIG. 2, feedwater enters the waste heat boiler AHK at "c", flows through the supporting pipes and walls of the cage, is evaporated and superheated in a first stage ECO+VD+UE1 of the steam generator 4, is conducted through a separating vessel 100, and is then superheated again in two additional stages UE2, UE3 of the steam generator 4 before exiting from the waste heat boiler AHK at "e" as superheated steam.

This steam flows through a first stage HD of a steam turbine set and then, at "f", enters the two-stage reheater ZÜ having stages ZÜ1, ZÜ2 from which it exits again at "g".

After the flue gas RG entering the waste heat boiler AHK at "a" has given off heat in stages ECO+VD+UE1, UE2 and UE3 of the steam generator 4 and ZÜ1, ZÜ2 of the reheater ZÜ, it exits from the waste heat boiler AHK at "b". It is desulfurized in a desulfurizing device 5 with a pressurized circulating fluidized bed and then almost completely condensed in a flue gas condenser 6.

The water W occurring in the flue gas condenser 6 is fed to the circuit of the coal gasification device 1 and to the CES burner 2. On the other hand, there is carbon dioxide $CO_2$ which is compressed partially in a refrigerating compressor 7.1 and partially in another compressor 7.2. The $CO_2$ from the refrigerating compressor 7.1 is fed to the hot gas expander 3 for cooling the blading, the $CO_2$ from the other compressor 7.2 is supplied to oil fields for increasing oil production.

In the flue gas condenser 6, the refrigerant, e.g., ammonia $NH_3$, occurring through heat exchange is expanded in an expander 8 whose driveshaft drives not only a generator 10.2 but also the two compressors 7.1, 7.2.

High-pressure steam from the steam generator 4 of the waste heat boiler AHK is expanded in a first stage HD of a steam turbine set and is fed into the cold rail of the reheater ZÜ of the waste heat boiler AHK at "f". After heat exchange with the flue gas, the steam exits the waste heat boiler AHK at "g" and is throttled in a throttling device, for example, a control valve M. The steam flows from the latter into a second stage MD and then partially into a third stage ND of the steam turbine set. A portion of the steam is taken off from the steam turbine and fed to the low-pressure and/or high-pressure feedwater preheater, which is indicated in FIG. 1 by the arrows emanating from the high-pressure (HD) part and in the middle part of stages MD, ND. The steam turbine set drives a generator 10.3, the exhaust heat potential of the expanded steam is precipitated in a condenser.

The steam generated from the exhaust heat of the coal gasification device 1 is fed into the waste heat boiler AHK through the cold ZÜ rail "f" via a connecting line 24 in order to be heated to the required temperature in the reheater ZÜ.

A partial flow of the total ZÜ steam feeds a suitable steam turbine 20 which drives the air compressor 21. The compressed air is fed into the air regeneration unit 22 which separates the air into nitrogen and oxygen.

The invention is not limited by the embodiments described above which are presented as examples only but can be modified in various ways within the scope of protection defined by the appended patent claims.

I claim:

1. A power plant comprising:
a coal gasification device for gasifying coal;
a gas combustion device for combusting synthesis gas from said coal gasification device;
a hot gas expander for generating usable output power by expansion of flue gas from said gas combustion device;
a steam generator for heating feedwater through exhaust heat of the expanded flue gas;
a steam turbine set with at least a high pressure first stage for expanding steam from said steam generator; and
a reheater arranged after said first stage of said steam turbine set and through which expanded flue gas flows; said power plant further comprising one of a throttle device disposed after said reheater and a conditioning valve for steam takeoff before said high-pressure first stage.

2. The power plant according to claim 1, wherein said steam turbine set comprises a second stage for further expansion of steam from said first stage; and wherein one of said reheater and said throttle device is arranged between said first stage and said second stage of said steam turbine set.

3. The power plant according to claim 1, wherein said steam generator and said reheater are integrated in a waste heat boiler.

4. The power plant according to claim 1, additionally comprising a desulfurizing device for desulfurizing the expanded flue gas after a waste heat boiler.

5. The power plant according to claim 4, additionally comprising a refrigerating compressor for compressing carbon dioxide gas from said desulfurizing device which is connected to said hot gas expander.

6. The power plant according to claim 5, additionally comprising a flue gas condenser for condensing flue gas which is arranged between said desulfurizing device and said compressor.

7. The power plant according to claim 6, additionally comprising a refrigerant expander - connected to said flue gas condenser.

8. The power plant according to claim 1, additionally comprising an oxygen feed connected to one of said coal gasification device and said gas combustion device.

9. The power plant according to claim 1, wherein said coal gasification device includes a device for quenching by water injection.

10. The power plant according to claim 1, wherein said gas combustion device is a CES burner.

11. The power plant according to claim 1, wherein said steam generator is a waste heat steam generator.

12. A process for generating usable output power comprising steps of: gasifying coal in a coal gasification device;
   combusting synthesis gas from the coal gasification device in a gas combustion device;
   generating usable output power in a hot gas expander by expansion of flue gas from the gas combustion device;
   heating feedwater in a steam generator by exhaust heat of the expanded flue gas;
   expanding steam from the steam generator in a first stage of a steam turbine set;
   reheating the steam in a reheater by the expanded flue gas; and further comprising one of the steps of throttling of the steam in a throttle device following said reheater and taking off steam before the high-pressure part with a conditioning valve.

13. Process according to claim 12, wherein the steam from the first stage of the steam turbine set is expanded in a second stage, and the steam is throttled in the throttle device between the reheater in a waste heat boiler and a second stage of the steam turbine set.

14. The process according to claim 12, wherein the steam is taken off before the first stage of the steam turbine set and is reduced by the conditioning valve to the state of a cold reheater rail.

15. The process according to claim 12, additionally comprising desulfurizing of the expanded flue gas after a waste heat boiler in a desulfurizing device.

16. The process according to claim 12, additionally comprising the steps of compressing of carbon dioxide gas from a flue gas condenser by a refrigerating compressor;
   cooling of the hot gas expander by means of carbon dioxide gas from the refrigerating compressor; and
   compressing of the residual $CO_2$ gas for enhanced oil recovery.

17. The process according to claim 12, additionally comprising the steps of compressing air with a compressor to generate oxygen; and charging one of a coal gasification device and gas combustion device with the oxygen.

18. The process according to claim 12, wherein said heating of said feedwater is performed by one of the steps of evaporating and superheating the feedwater.

* * * * *